United States Patent Office 2,764,489
Patented Sept. 25, 1956

2,764,489

LIQUID REFRIGERANT FOR CANNING

Cleo Veazey, Dallas, Tex., assignor to The Freezit Corporation of America, Dallas, Tex.

No Drawing. Application June 21, 1954,
Serial No. 438,345

1 Claim. (Cl. 99—198)

This invention relates to a new composition of matter and more particularly to a liquid heat absorbing composition for the refrigeration of perishables.

The principal object of the invention is to provide a convenient and sanitary medium for the preservation of foods such as may be carried in picnic baskets, to protect game and fish from spoiling for reasonable periods of time and for many other adaptations where permanent refrigeration is not immediately available. To this end the invention supplants water ice which requires special storage and handling to preclude too rapid melting and to prevent water damage to the perishables. Moreover, the invention may be used in certain cases as a substitute for solid carbon dioxide when employed as a refrigerant and which also requires a special container to prevent freezing of the foodstuffs and to reduce sublimation. In either case, the refrigerant must be kept separate from the perishables it preserves and when melted or sublimated is of no further use.

It is therefore an important object of the invention to provide a liquid composition packed in sealed containers of such capacity that they may be placed in the freezing compartment of a home refrigerator or deep freeze unit so that the contents of the containers may be frozen solid. When so frozen, the container contents, by virtue of the nature of the composition, remain frozen for long periods of time and the containers may be packed around and in close association with the foodstuffs in a basket, creel or other container to serve exactly the same as ice but in a more sanitary and convenient manner.

Still another object of the invention is to provide a liquid refrigerant consisting of a composition packed in cans or other types of containers and which can be refrozen to restore the liquid to a solid as many times as desired with the same effective results.

Yet another object of the invention is to provide a liquid composition which contains an inhibitor against oxidation, rust or corrosion, hence making possible the storing of the composition in metal cans over long periods of time.

Other objects will become manifest in the course of the following description in which the invention is fully set forth.

Each gallon of the concentrated chemicals making up the composition consists of:

| | Ounces |
|---|---|
| Sodium chloride | 12 |
| Magnesium sulphate | 6 |
| Sodium bicarbonate | 6 |

To the above dry chemicals is added ½ oz. sapphiran blue which is an aniline dye coated on sugar granules to permit rapid solubility in cold water. These ingredients are then mixed thoroughly, after which water in quantity sufficient to produce one gallon of liquid is added.

For each gallon of the above concentrate there is added 49 gallons of water in mixing tanks or vats and this final diluted solution is packed in cans in any conventional manner and sealed.

The magnesium sulphate or epsom salts and sodium chloride have been employed because of their known heat absorption characteristics and, since it is most suitable to to employ a metallic container for maximum radiation, sodium bicarbonate is added as a rust inhibitor so that the metal cans will not deteriorate and may be used again and again by re-freezing.

The coloring solution, sapphiran blue, or an equivalent, distinguishes the composition from plain water and can more readily be observed in its course through the canning process.

It is evident from the foregoing that a refrigerant is provided which affords adequate cooling for perishables much in the same manner as ice without the attendant difficulties associated with the use of ice and more economically for the reason that the canned ice can be reused indefinitely, by re-freezing the contents of the cans after melting.

Manifestly, the steps of the herein described process are subject to such variations from time to time as varying conditions may require and it is understood that no limitations are intended except as set forth in the annexed claim.

What is claimed is:

A composition of matter producing a liquid freezable in metal cans as a refrigerant, the same consisting essentially of 12 oz. sodium chloride, 6 oz. magnesium sulphate and 6 oz. sodium bicarbonate to one gallon of water to produce a concentrate adapted to be combined with water to make up a total volume of fifty gallons for canning in proportionately small quantities, said sodium bicarbonate constituting an inhibitor against corrosion of said cans.

References Cited in the file of this patent

UNITED STATES PATENTS

| 1,007,060 | Brazelle | Oct. 31, 1911 |
| 1,772,618 | Schmidt | Aug. 12, 1930 |
| 2,509,579 | Sharma | May 30, 1950 |

FOREIGN PATENTS

| 11,371 | Australia | Oct. 19, 1933 |